Figure 1:
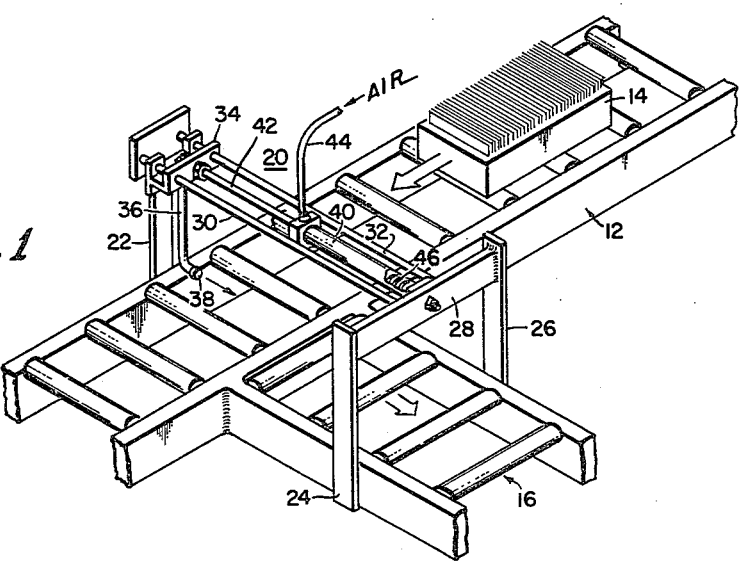

Nov. 12, 1963   B. C. HOLBEN   3,110,383
DIVERTER MECHANISMS FOR AUTOMATIC ROUTING CONVEYORS
Filed April 20, 1961

INVENTOR
Bernard C. Holben
By Anthony D. Cennamo

3,110,383
DIVERTER MECHANISMS FOR AUTOMATIC ROUTING CONVEYORS
Bernard C. Holben, Dublin, Ohio, assignor to Industrial Nucleonics Corporation, a corporation of Ohio
Filed Apr. 20, 1961, Ser. No. 104,291
3 Claims. (Cl. 193—36)

This invention relates generally to conveyor systems and more specifically to improved apparatus for diverting articles from one conveyor to another.

In conveyor systems, articles traveling on a main conveyor line must frequently be routed onto other intersecting branch conveyors for purposes of sorting or storage. It may be desired to either divert the articles whereby their direction of travel is altered or to transfer articles from one conveyor to another traveling in the same direction. Whatever the operation the actuating member must be positive-acting. Reliability and quickness of operation is essential to the successful operation of conveyor systems handling large volumes of traffic. Recently, the trend has been to higher conveyor line speeds approaching 120 feet per minute and a traffic volume approaching thirty or thirty-five units per minute. Slow-acting prior art devices have failed to cope with these high conveyor speeds especially where the traffic density is greater than fifteen units per minute.

The present invention provides a diverter actuated by a pneumatic piston and cylinder pusher type driving device. In this connection, it is appropriate to point out the fact that pneumatic cylinder-actuated pusher type actuators are well known in the conveyor art for transferring articles from one conveyor to another. For examples of such devices, reference may be made to Patents Nos. 2,881,898 and 2,990,965. At least for the present purpose, however, a distinction is made between these prior art devices, herein referred to as "transfer mechanisms," and devices in the category of the present invention which are referred to as "diverters." For an example of a diverter, reference can be made to my copending application Serial No. 795,782, filed February 26, 1959, now U.S. Patent No. 2,986,264.

Insofar as it affects the present invention, one of the essential requirements of the diverter is that when switching an article from one conveyor to another, the orientation of the article with respect to its line of travel must not be changed; that is to say, the article must always proceed "head first" throughout its entire tortuous path through the conveyor network. Hence it is the function of the diverter to sort of steer the article so that first its front end and then its rear end generally swings in an arcuate path off of the main conveyor and onto the branch conveyor.

In contradistinction to this desired arcuate movement, the piston and cylinder driving device inherently generates straight-line motion. No particular problem arises in the application of this device to an ordinary pusher type transfer mechanism, which is permitted to engage the article with a wide, flat shoe and simply shove the article broadside off the conveyor. However, it is believed that the piston and cylinder pusher type device has not been heretofore applied to diverters, except in combination with rather complex and expensive articulated and curvilinear structures.

In accordance with this invention, I have found that a piston and cylinder type actuator can be employed in a diverter mechanism which is not only effective and reliable, but remarkably simple and inexpensive. In one form of the invention, the diverter mechanism consists of an ordinary commercial piston and cylinder having the usual axial push rod, and wherein the push rod is tipped with an article engaging member which is preferably ball-shaped on the end to provide a spherical article-contacting surface. The tip member is quite small in dimensions compared with the article to be diverted, and when it is driven against the rigid side of a passing article such as a mail tray, it provides a sort of rolling pivot around which the tray is turned into its diverted path along the receiving conveyor.

Contributing significantly to the simplicity and economy of constructing the device is the fact that the article contacting surface of the tip is a figure of revolution around the axis of the push rod, and accordingly the push rod and/or the tip is not required to be indexed to prevent rotation with respect to the drive cylinder. This saves the cost and maintenance of a system of auxiliary guide rods or channels and the associated carriage arrangement which is commonly provided in conventional pusher transfer mechanism to maintain the proper angular alignment of the article-contacting shoes used thereon.

For certain installations, for example, where it is necessary or desirable to avoid having appurtenances of the diverters projecting into the aisle along the main conveyor, a second form of the invention provides an aisle space saving arrangement wherein the diverter is mounted overhead of the conveyors with the drive cylinder extending in the direction of the article receiving conveyor. The moving part of the diverter comprises a hook-shaped member having an elongated shank portion, which may be constituted by the push rod of a commercial air cylinder, and a bight portion which extends downwardly to the level of the passing articles and is terminated by an article-engaging tip member similar to that described above. In this form of the invention, the hook is adapted to reach across the main conveyor and pull the article around into its diverted path when the piston rod is retracted.

Accordingly, it is a primary object of the present invention to provide an improved article diverter for rapid conveyor systems.

It is another object of the present invention to provide an article diverter that is quick and reliable in operation.

It is still another object of the present invention to provide an article diverter which requires only a minimum of mounting space.

It is yet another object of the present invention to provide an article diverter that is simpler to construct and more economical to maintain in satisfactory working order than similar devices used heretofore.

Figure 2:
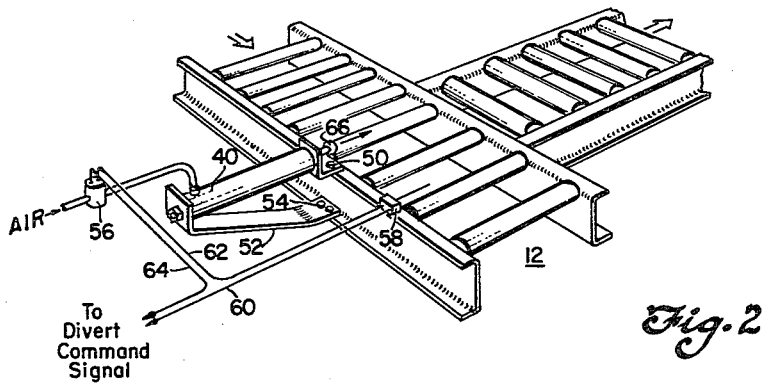

These and other advantages of the present invention will become more apparent from the following description taken in conjunction with the drawings, in which:

FIG. 1 is an isometric view of an overhead diverter constructed in accordance with the present invention; and FIG. 2 is a perspective view of a side-mounted diverter.

Referring to the drawings and specifically to FIG. 1, a section of a typical roller conveyor system is shown. A main conveyor 12 is adapted to transport trays 14 in the direction indicated by the large arrow. One branch conveyor 16 is shown intersecting at right angles to the main conveyor.

The diverter mechanism 20 is supported at one end by a vertical bracket 22 mounted on the side of the main conveyor 12 opposite to the branch conveyor 16. At the other end, a pair of upstanding stanchions 24, 26 are mounted on opposite sides of the branch conveyor 16 and are joined by a horizontal plate 28. A pair of guide rods 30, 32 are supported between the plate 28 and the bracket 22. A traversing carriage 34 is slidably mounted on the guide rods 30, 32. A downwardly depending puller arm 36, resembling the bight portion of a hook, is attached to the traversing carriage 34. The end of the puller arm 36 terminates in a rounded, hard-wearing nylon plastic tip 38, of quite small dimensions relative to the size of the tray 14, around which the tray may pivot and turn onto the receiving conveyor 16 when the hook is retracted.

The carriage 34 is driven by an air cylinder 40 and piston rod 42 mounted between the carriage and the plate 28, with the piston rod forming the shank portion of the hook aforesaid. Air is admitted under pressure through a conduit 44 communicating with one end of the cylinder 40. The air cylinder 40 may either be double-acting or provided with a return spring 46.

When a tray to be diverted assumes a position on the main conveyor 12 opposite the entrance of the branch conveyor, air is admitted by manual or automatic means into the conduit 44. The piston rod 42 is retracted, carrying the carriage 34 and puller arm 36 with it. The puller arm 36 engages the side of the tray 14 and turns it onto the branch conveyor 16. Whereupon, air pressure is removed and the spring 46 returns the assembly to the inoperative position shown to eliminate interference with other trays traveling on the main conveyor 12.

In those systems where aisle space considerations permit, the embodiment shown in FIG. 2 is preferably used. Referring to FIG. 2, the cylinder is mounted on the side of the main conveyor. An angle bracket 50 is fastened to the upper side ledge of the main conveyor 12 and serves to mount the forward end of the air cylinder 40. A supporting bracket 52 is fastened to the lower side ledge as at 54 and bent to extend upwardly to embrace the rear of the air cylinder.

An electrically-operated solenoid valve 56 may be used to control the flow of air into the cylinder 40. A tray position-sensing switch 58 may be mounted downstream from the pusher element and connected to both the solenoid 56 and to a divert command signal device (not shown) by means of electrical conductors 60—64.

In this embodiment, the piston rod, which is normally retracted, is tipped by a ball-shaped article engaging member 66 which provides a small, spherical surface for contacting the tray. Since the ball tip is a figure of revolution around the axis of the cylinder and push rod, any accidental or other rotation of the piston, the rod, or the tip with respect to the cylinder does not affect or alter the proper pivotal engagement of the article contacting surface with the tray. Hence no auxiliary guide means, such as the guide rods and carriage arrangement of FIG. 1, is required. When a tray to be diverted is located at the intersection the switch 58 is actuated and tip member 66 is extended to engage the side of the tray. Upon completion of the diverting function the rod is automatically returned by means of the above-mentioned spring or in the case of a double-acting cylinder by automatic air flow reversing means. Trays passing the intersection which are not to be diverted will actuate the switch 58 but the solenoid 56 will not energize due to the absence of a divert command signal on lines 60, 64.

While the present invention has been described in terms of specific apparatus, this construction should not be in any way interpreted as limiting the invention. Inasmuch as numerous additions, omissions and substitutions may be made to the illustrated embodiments without detracting from the original spirit and scope of the invention, the only restrictions are those clearly imposed by the following claims.

I claim:

1. In a conveyor system wherein a main conveyor bearing articles to be distributed is intersected from one side by a branch conveyor, an article diverter comprising a generally hook-shaped member having a long straight shank portion and a bight portion which carries on the end thereof an article-engaging member of relatively small size in comparison with said articles and having a curved surface adapted to form a pivot around which said articles may turn when engaged by said surface; means suspending said hook member with said shank portion above said conveyors so as to clear said articles passing therealong and extending in the direction of said branch conveyor, and with said bight portion depending from the end of said shank portion which extends in the direction away from said branch conveyor, said suspension means including means for guiding said shank portion for axially sliding movement, from an inoperative position wherein said bight portion extends across and beyond the path of said articles on said main conveyor, across said main conveyor whereby said article engaging member on said bight portion engages the side of a passing article and directs the same laterally off said main conveyor and onto said branch conveyor; a pneumatic piston and cylinder driving device having a push rod for maintaining said inoperative position when the same is extended and for actuating said sliding movement to divert one of said articles when said push rod is retracted and a compressed air supply for said cylinder controlled by the arrival of one of said articles to be diverted at a selected position relative to said diverter for causing said push rod to retract.

2. In a conveyor system wherein a main conveyor bearing articles to be distributed is intersected from one side by a branch conveyor, an article diverter comprising a generally hook-shaped member having a long straight shank portion and a bight portion which carries on the end thereof an article-engaging member of relatively small size in comparison with said articles and having a curved surface adapted to form a pivot around which said articles may turn when engaged by said surface; means suspending said hook member with said shank portion above said conveyors so as to clear said articles passing therealong and extending in the direction of said branch conveyor, and with said bight portion depending from the end of said shank portion which extends in the direction away from said branch conveyor, said suspension means including means for guiding said shank portion for axially sliding movement from an inoperative position wherein said bight portion extends across and beyond the path of said articles on said main conveyor, across said main conveyor whereby said article engaging member on said bight portion engages the side of a passing article and directs the same laterally off said main conveyor and onto said branch conveyor; a pneumatic piston and cylinder driving device having a push rod constituting an extension of said shank member for maintaining said inoperative position when the same is extended and for actuating said sliding movement to divert one of said articles when said push rod is retracted and a compressed air supply for said cylinder controlled by the arrival of one of said articles to be diverted at a selected position relative to said diverter for causing said push rod to retract.

3. In a conveyor system wherein a main conveyor bearing articles to be distributed is intersected from one side by a branch conveyor, an article diverter comprising a generally hook-shaped member having a long straight shank portion and a bight portion which carries on the terminal end thereof an article-engaging member which is of relatively small size in comparison with the size of said articles and with a curved surface for making substantially point-contact with said articles; means suspending said hook member with said shank portion above said conveyors so as to clear said articles passing therealong and extending in the direction of said branch conveyor, and with said bight portion depending from the end of said shank portion which extends in the direction away from said branch conveyor, said suspension means including means for guiding said shank portion for axially sliding movement, from an inoperative position wherein said bight portion extends across and beyond the path of said articles on said main conveyor, across said main conveyor whereby said article-engaging member on the terminal end of said bight portion engages the side of a passing article and directs the same laterally off said main conveyor and onto said branch conveyor; a pneumatic piston and cylinder driving device having a push rod for maintaining said inoperative position when the same is extended and for actuating said sliding movement to divert one of said articles when said push rod is retracted and a compressed air supply for said cylinder controlled by the arrival of one of said articles to be diverted at a selected position relative to said diverter for causing said push rod to retract.

References Cited in the file of this patent

UNITED STATES PATENTS

| | | |
|---|---|---|
| 1,906,786 | Bowman et al. | May 2, 1933 |
| 2,881,898 | Reilly | Apr. 14, 1959 |
| 2,986,264 | Holben | May 30, 1961 |
| 2,990,965 | Smoll | July 4, 1961 |